United States Patent
Dhyllon

(10) Patent No.: US 10,100,534 B2
(45) Date of Patent: Oct. 16, 2018

(54) MORTAR MIXTURE AND METHOD OF LAYING TILES EMPLOYING THE SAME

(71) Applicant: Amen Dhyllon, Wynnewood, PA (US)

(72) Inventor: Amen Dhyllon, Wynnewood, PA (US)

(73) Assignee: Serendipity Technologies LLC., Wynnewood, PA (US)

( * ) Notice: Subject to any disclaimer, the term of this patent is extended or adjusted under 35 U.S.C. 154(b) by 245 days.

(21) Appl. No.: 15/231,013

(22) Filed: Aug. 8, 2016

(65) Prior Publication Data

US 2018/0037503 A1    Feb. 8, 2018

(51) Int. Cl.
| | |
|---|---|
| *C04B 28/02* | (2006.01) |
| *E04F 15/02* | (2006.01) |
| *E04F 15/08* | (2006.01) |
| *E04F 21/22* | (2006.01) |
| *C04B 111/00* | (2006.01) |

(52) U.S. Cl.
CPC .......... *E04F 15/0215* (2013.01); *C04B 28/02* (2013.01); *E04F 15/08* (2013.01); *E04F 21/22* (2013.01); *C04B 2111/00672* (2013.01)

(58) Field of Classification Search
CPC ..... C04B 14/06; C04B 14/104; C04B 14/365; C04B 26/285; E04F 15/0215; E04F 15/08
See application file for complete search history.

(56) References Cited

U.S. PATENT DOCUMENTS

| | | | |
|---|---|---|---|
| 9,272,952 B2 * | 3/2016 | Choi | .......... C04B 28/02 |
| 9,926,233 B2 * | 3/2018 | Assmann | ............ C04B 28/04 |
| 2005/0241541 A1 * | 11/2005 | Hohn | .............. B63H 3/008 |
| | | | 106/805 |
| 2013/0284069 A1 | 10/2013 | Dubey | |
| 2015/0047292 A1 | 2/2015 | Komura et al. | |
| 2015/0184059 A1 | 7/2015 | Witham et al. | |

FOREIGN PATENT DOCUMENTS

| | | | |
|---|---|---|---|
| CN | 104261784 A | * | 1/2015 |
| CN | 105819814 A | * | 8/2016 |

* cited by examiner

*Primary Examiner* — Anthony J Green
(74) *Attorney, Agent, or Firm* — Adam Warwick Bell; Matthew Rupert Kaser

(57) ABSTRACT

Disclosed is an improved mortar mixture comprising a mixture of a pre-mortar mixture and water. The pre-mortar mixture comprises cement ranging between 37 and 41% by weight, sand ranging between 59 to 63% by weight, bentonite ranging between 0.001 and 0.003% by weight, Hydroxypropyl Methylcellulose (HMPC) ranging between 0.001 and 0.002% by weight and plaster of paris ranging between 0.002 and 0.004% by weight.

9 Claims, 2 Drawing Sheets

MORTAR MIXTURE AND METHOD OF LAYING TILES EMPLOYING THE SAME

BACKGROUND

Technical Field

The present disclosure relates to the field of masonry specifically related to the laying of tiles and the concrete/mortar used therefor and more particularly, to an improved mortar mixture and a novel method of laying floor tiles employing the same.

Ceramic tiles, due to their being excellent in maintainability, beautiful in visual appeal and cheaper compared to stone materials (such as, for example, marble stone), have been in demand more than ever and recent industry studies show that said demand is here to stay. However, conventional construction methods associated with ceramic-tile-laying (such as, pressure bonding foundation method, laid mortar foundation method, etc.) suffer from a host of problems such as, necessity to employ skilled workers, necessity to employ heavy machinery, instability and inaccuracy after finish, time consumption, occurrence of defects due to ageing, etc. Keeping in mind the existing huge demand for ceramic tiles, there is a strong need in the art for a novel tile-laying method that addresses the aforementioned issues.

SUMMARY

The present invention comprises a method of laying tiles, which initiates with a conventional cleaning of a foundation surface whereon, a foundation layer of a mortar mixture is to be laid. Once the foundation surface is cleaned, the same surface is scribed or primer-coated. Upon scribing or primer coating, the surface is laid with a foundation layer of the mortar mixture whereafter, a striper is employed for turning the foundation layer into a plurality of elongate ridges that are spaced-apart and parallel to one another. The striper comprises a hand tool comprising a substantially planar, rectangular, elongate, horizontal member wherein, the planar sides thereof are perpendicular to the ground. A plurality of spaced-apart teeth integrally extends from the bottom (edge) of the horizontal member. An elongate handle is centrally attached atop the horizontal member such that, the horizontal member and the handle are parallel to one another. The ridges are formed by pulling the striper about its handle while the teeth pass through the foundation layer. Once the ridges are formed, the tiles are laid atop them whereafter, the tiles directly bond with foundation layer, which takes up an approximate time of 280 hours. This follows cleaning the following day. Following the cleaning, tiles are subjected to joint construction if applicable or they are wiped whereafter, the work is up for inspection and rework (if necessary).

The method of the present invention is efficient, speedy as foundation repairs (such as plastering and leveling) essential to conventional pressure bonding methods are rendered unnecessary. This also significantly reduces construction costs and time. Also, as the method of the present invention allows direct bonding with concrete or whatever foundation, it therefore eliminates gouging, coupling and repair, which results in significant reduction of construction costs and time. As far as the matter of employing implements and tools, the method can be carried out using simple tools such as, for example, a hand mallet in lieu of employing heavy machinery (such as, forklifts, power shovels, etc.) which is generally employed for conventional construction methods, such as, for example, laid mortar method. These aspects of eliminating heavy machinery, conventional processes, such as, conducting foundation repairs, gouging, etc., significantly eases the operations thereby eliminating the need for employing skilled workers. Due to the lack of heavy machinery and cutting down of many sub-processes, dust hardly flies during carrying out the method on-site, which resulting in a cleaner environment. The mortar/concrete employed for the method of the present invention eliminates many aggregates and significantly reduces necessary water amounts thereby decreasing the total construction weight especially on upper floors.

The method of the present invention to its credit achieves bonding margin to finish surface of 20 to 25 m/m, which is not applicable to any field for conventional methods. The method can also accommodate large ceramic tiles of up to 1200 square meters. Alternatively, the method also accommodates the laying of large marble and granite stones. The method further allows finish height with the bonding material to be adjusted, which is impossible with conventional methods. More particularly, with the conventional method, it has become possible to agitate bonding material by mixer (large and automatic) due to the fact that the foundation formation necessary for bonding can be performed at a speed of approximately two times compared to conventional methods. This is also one of the reasons for cutting of construction costs and time. More particularly, the settling time of this mortar is as fast as 4 to 5 hrs. Whereas, when it comes to regular conventional methods, the setting time is 12 to 14 hrs.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the accompanying drawings, which form a part of this disclosure, wherein.

Figure 1:
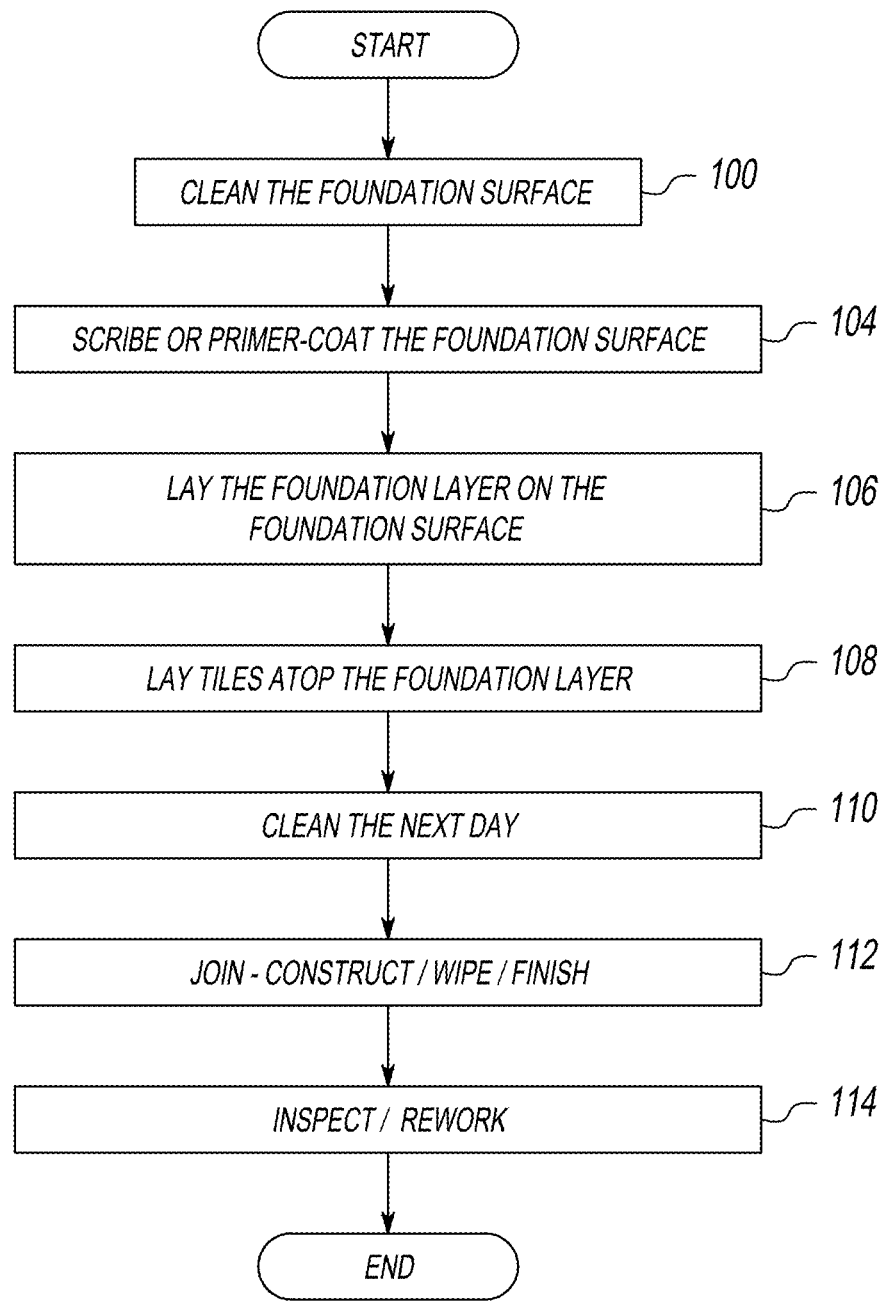
FIG. 1, according to an embodiment of the present disclosure, is a flowchart depicting the method of laying tiles.

The various aspects of the present disclosure mentioned above are described in further detail with reference to the aforementioned figures and the following detailed description of exemplary embodiments.

FIGURES—REFERENCE NUMERALS

10—Striper
12—Horizontal Member
14—Tooth
16—Handle
18—Ridge

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice them and it is to be understood that the logical, mechanical and other changes may be made without departing from the scope of the embodiments. The following detailed description is therefore not to be taken in a limiting sense.

The present invention comprises an improved mortar mixture, which is especially used for the laying of floor tiles both indoors and outdoors. Alternatively, the method also accommodates the laying of large marble and granite stones. Also, the method is employed for wall cladding with tiles. Notably, the mortar mixture may also be referred to as concrete mixture depending on the quantity of water-cement ratio used. The mortar mixture is basically a mixture of predefined quantities of pre-mortar mixture and water. The pre-mortar mixture is composed of 37% of cement by weight, sand ranging between 59 to 63% by weight, 0.002% of bentonite by weight, 0.0015% of high-viscosity Hydroxypropyl Methylcellulose (HMPC) by weight, and 0.3% of plaster of paris by weight. Of the sand, the majority thereof, i.e., nearly 80% thereof, is composed of size greater than or equivalent to 150 microns and lesser than 200 microns. The rest of the sand comprises a size lesser than 600 microns. The pre-mortar mixture optionally comprises 0.001% of chemical foam by weight wherein, the chemical foam comprises detergent powder. The pre-mortar mixture is mixed with water for a minimum of two minutes leading to the formation of the mortar mixture. Notably, for every 75 kgs of pre-mortar mixture, the amount of water to be added ranges between 18.5 to 19.5 liters. The resultant mortar mixture has a specific gravity of 1.55 to 1.63.

Figure 2:
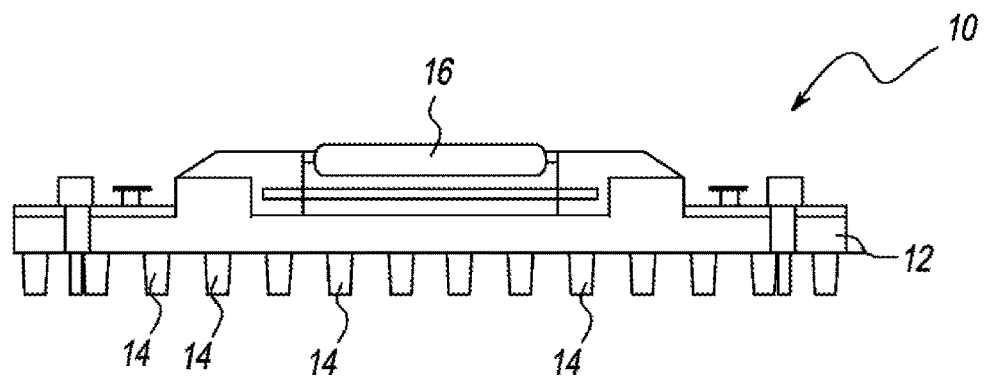
FIG. 2, according to an embodiment of the present disclosure, is an illustration of the striper.
Figure 3:
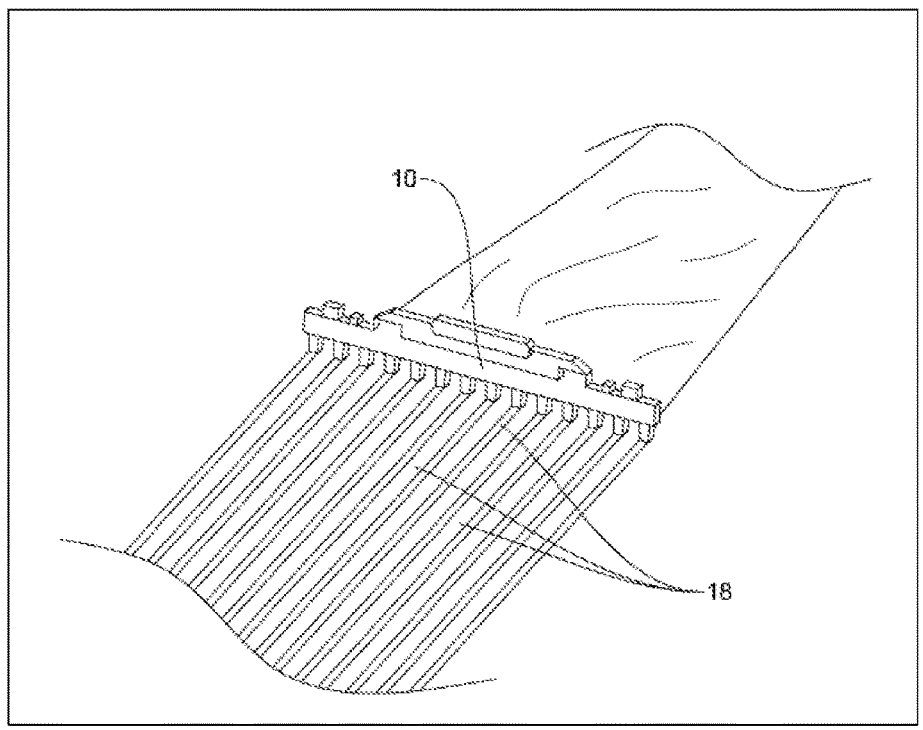
FIG. 3, according to an embodiment of the present disclosure, is an illustration of the striper being employed on a foundation layer.

The present invention further comprises a method of laying tiles by employing the aforementioned mortar mixture. Referring to FIG. 1, the method initiates with a conventional cleaning (step 100) of a foundation surface whereon, a foundation layer of the mortar mixture is to be laid. The process of foundation surface cleaning takes up an approximate time of 16 working hours. Once the foundation surface is cleaned, the same surface is scribed or primer-coated (step 102), which also takes up an approximate time of 16 working hours. Upon scribing or primer coating, the surface is laid with a foundation layer (step 104) of the mortar mixture whereafter, a striper is employed (step 106) for turning the foundation layer into a plurality of elongate ridges that are spaced-apart and parallel to one another. Referring to FIG. 2, the striper 10 comprises a hand tool comprising a substantially planar, rectangular, elongate, horizontal member 12 wherein, the planar sides thereof are perpendicular to the ground. A plurality of spaced-apart teeth 14 integrally extends from the bottom (edge) of the horizontal member 12. An elongate handle 16 is centrally attached atop the horizontal member 12 such that, the horizontal member and the handle are parallel to one another. As can be appreciated from FIG. 3, the ridges 18 are formed by pulling the striper 10 about its handle 16 while the teeth 14 pass through the foundation layer. Once the ridges 18 are formed, the tiles are laid atop them (step 108) whereafter, the tiles directly bond with foundation layer, which takes up an approximate time of 280 hours. This follows cleaning the following day (step 110), which takes up an approximate time of 24 hours. Following the cleaning, tiles are subjected to joint construction if applicable or they are wiped (step 112) whereafter, the work is up for inspection (and rework), which takes an approximate time of just 16 hours (step 114).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A mortar mixture comprising a mixture of:
(a) a pre-mortar mixture comprising: (i) cement ranging from 37% to 41% by weight; (ii) sand ranging between 59 to 63% by weight; (iii) bentonite ranging between 0.001 and 0.003% by weight; (iv) Hydroxypropyl Methylcellulose (HMPC) ranging between 0.001 and 0.002% by weight; and (v) plaster of Paris ranging between 0.002 and 0.004% by weight; and
(b) water,
wherein for every 75 kg of pre-mortar mixture, the amount of water added is between 18.5 to 19.5 liters,
wherein the resultant mortar mixture has a specific gravity of 1.55 to 1.63.

2. The mortar mixture of claim 1 consisting of a mixture of:
(a) a pre-mortar mixture consisting of: (i) cement ranging from 37% to 41% by weight; (ii) sand ranging between 59 to 63% by weight; (iii) bentonite ranging between 0.001 and 0.003% by weight; (iv) Hydroxypropyl Methylcellulose (HMPC) ranging between 0.001 and 0.002% by weight; and (v) plaster of Paris ranging between 0.002 and 0.004% by weight; and
(b) water,
wherein for every 75 kg of pre-mortar mixture, the amount of water added is between 18.5 to 19.5 liters,
wherein the resultant mortar mixture has a specific gravity of 1.55 to 1.63.

3. The mortar mixture of claim 1 wherein, the pre-mortar mixture further comprises chemical foam ranging between 0.0005 to 0.0015% by weight, wherein the chemical foam comprises detergent powder.

4. The mortar mixture of claim 2 wherein, the size of nearly 80% of the sand is lesser than 200 microns and greater than or equivalent to 150 microns.

5. The mortar mixture of claim 4 wherein, the size of the rest of the sand is lesser than 600 microns.

6. The mortar mixture of claim 2 having a setting time of up to 5 hours.

7. The mortar mixture of claim 2 wherein, the pre-mortar mixture and water are mixed for a minimum of two minutes leading to the formation thereof.

8. A mortar mixture comprising a mixture of: (a) a pre-mortar mixture comprising: (i) cement ranging from 37% to 41% by weight; (ii) sand ranging between 59 to 63% by weight; (iii) bentonite ranging between 0.001 and 0.003% by weight; (iv) Hydroxypropyl Methylcellulose (HMPC) ranging between 0.001 and 0.002% by weight; and (v) plaster of Paris ranging between 0.002 and 0.004% by weight; and (b) water wherein, the mortar mixture comprises a specific gravity ranging between 1.55 to 1.62.

9. A method for laying tiles comprising: (a) laying a foundation layer of a mortar mixture over a foundation surface; (b) striping the layer with a striper whereby the layer is turned into a striped layer comprising a plurality of elongate parallel ridges; and (c) laying tiles over the striped layer resulting in direct bonding between the tiles and the striped layer over time, wherein said mortar mixture consists of a mixture of:
  (a) a pre-mortar mixture consisting of: (i) cement ranging from 37% to 41% by weight; (ii) sand ranging between 59 to 63% by weight; (iii) bentonite ranging between 0.001 and 0.003% by weight; (iv) Hydroxypropyl Methylcellulose (HMPC) ranging between 0.001 and 0.002% by weight; and (v) plaster of Paris ranging between 0.002 and 0.004% by weight; and
  (b) water,
  wherein for every 75 kg of pre-mortar mixture, the amount of water added is between 18.5 to 19.5 liters,
  wherein the resultant mortar mixture has a specific gravity of 1.55 to 1.63.

* * * * *